United States Patent [19]

Greig et al.

[11] 4,370,683

[45] Jan. 25, 1983

[54] CROSS-COUPLED SERVO CONTROL MECHANISM FOR REEL-TO-REEL TAPE DRIVES

[75] Inventors: George H. Greig; Archibald M. Pettigrew, both of Kirkcaldy, England

[73] Assignee: Burroughs Corporation, Detroit, Mich.

[21] Appl. No.: 91,441

[22] Filed: Nov. 5, 1979

[30] Foreign Application Priority Data

Nov. 28, 1978 [GB] United Kingdom ............... 46353/78

[51] Int. Cl.$^3$ ....................... G11B 15/46; G11B 19/20
[52] U.S. Cl. ..................................... 360/73; 242/186; 242/203; 318/327; 360/72.2
[58] Field of Search ................. 360/73, 71, 72.3, 74.1, 360/74.2; 318/326–328, 318, 317, 7–8; 242/186, 203

[56] References Cited

U.S. PATENT DOCUMENTS

| 3,764,087 | 10/1973 | Paananen et al. | 318/327 |
| 3,913,134 | 10/1975 | Sargunar | 360/73 |
| 3,984,868 | 10/1976 | Ragle et al. | 242/186 |
| 4,015,799 | 4/1977 | Koski et al. | 242/203 |
| 4,091,314 | 5/1978 | Johnson | 318/328 |
| 4,156,257 | 5/1979 | Roberts | 360/73 |
| 4,157,488 | 6/1979 | Allan | 360/73 |

FOREIGN PATENT DOCUMENTS

| 2136684 | 2/1973 | Fed. Rep. of Germany | 360/73 |
| 1433421 | 4/1976 | United Kingdom | 242/186 |

OTHER PUBLICATIONS

IBM Tech. Disc. Bull., E. P. Kollar et al., Reel-to-Reel Tape Unit With Decreased Acceleration Time, vol. 14, No. 8, Jan. 1972, pp. 2331–2332.
IBM Tech. Disc. Bull., R. L. Colburn et al., Bidirectional PWM Motor Speed Control, vol. 14, No. 2, Jul. 1971, pp. 388–389.
IBM Tech. Disc. Bull., J. A. Weidenhammer, Electrical Differential Tape Drive Systems, vol. 12, No. 11, Apr. 1970, p. 1805.

Primary Examiner—Alfred H. Eddleman
Attorney, Agent, or Firm—David G. Rasmussen; Kevin R. Peterson; Edmund M. Chung

[57] ABSTRACT

The tape transport mechanism, in a tape drive for retrievable informational data storage, is provided with a cross-coupled tape speed control servomechanism, achieving controlled bidirectional movement and stopping of tape, without switching, and requiring only one polarity of power source for the motive elements.

10 Claims, 3 Drawing Figures

CROSS-COUPLED SERVO CONTROL MECHANISM FOR REEL-TO-REEL TAPE DRIVES

BACKGROUND OF THE INVENTION

1. Field of the Invention

The present invention relates to an apparatus for recording and reproducing information on tape. The invention is particularly related to a technique for controlled, bidirectional movement of tape, without switching, and requiring only one power source to drive the motive elements.

2. Description of the Prior Art

Tape drives for retrievable, informational data are common features of computer and other data processing systems.

It is a feature of their usage that they be able to cause the tape to move forwards or backwards, past the head in a controlled fashion, stopping and starting at intervals, as data is recorded or retrieved, bidirectionally, from among a plurality of data blocks which are laid down along the length of the tape. The stopping and starting of the tape must be accomplished in a set, short distance, this being the length of tape between data blocks, itself devoid of data records, so that data may only pass the head when the tape is at a correct operational speed.

Because of tape wear problems, and inertia problems, the older art of capstan driven tape transports has generally been abandoned in favour of 'reel-to-reel' techniques. In these techniques, there is no capstan present, the tape being caused to move past the head in a controlled fashion by means of torque, applied directly to the two tape storage reels by two motors one driving each reel, the two motors themselves under the control of a tape speed control servo mechanism, responsive to signals from a tape file control unit.

The design of the tape speed control servomechanism, has, in the past, been beset by problems concerning the implementation of bidirectional, controller drive. Because the tape must be able to stop and start in the same short distance in either direction, the response time of the servo must be substantially the same no matter which of the two reels is taking up or paying out the tape. In order to accomplish this end, it has been usual to mount a rotational speed sensing tachometer onto each reel turning motor, so that either tachometer may be used as the speed sensing element of the tape speed control servo. Much switching of common elements, or wastage, through only partial use, of unique elements, between the two motors, has been necessary to 'turn the servo round' in this manner.

In addition, because the diameter of the reels varies as the tape moves from one reel to the other, a fixed magnitude speed demand signal, from the tape drive control unit to the tape speed control servo, produces a different tape speed for one direction of tape travel compared to the tape speed produced for the other direction of tape travel, since the actual quantity controlled in the angular velocity of the monitored motor, and the linear tape speed is a linearly increasing function of the radius of the reel on that motor. The two reels being of different radii, the tape speeds for opposing directions will be different. Recomputation of speed demand signal by the tape drive controller then becomes necessary. A further disadvantage of the prior art has been the necessity for dual polarity power sources for the reel driving motor. This has complicated the amplifier design in tape speed control servos and limited the overall economy and utility of tape drives by requiring the availability of more than one high capacity power source.

SUMMARY OF THE INVENTION

An object of the present invention is to provide a novel apparatus for controlled, bidirectional tape movement in tape drives, requiring no switching of elements to reverse direction, and requiring only a single polarity power source for the motive elements.

According to one aspect of the present invention there is provided a tape drive, for retrievable, informational, data storage, wherein there is also provided apparatus, acting through a transducer, for data recording and data recovery, together with tape transport apparatus comprising; tape storage apparatus, and tape speed control apparatus; the tape storage apparatus consisting of two parts, a first part paying out and a second part taking up the tape, the tape being moved from the first to the second part of the tape storage apparatus, passing adjacent to the transducer, by the tape speed control apparatus; the tape speed control apparatus being a cross coupled servo, driving, by means of a first amplifier, having unidirectional output, a first tape moving apparatus, and by means of a second amplifier, of lesser gain, also having unidirectional output, a second tape moving apparatus; a speed transducer being coupled to the first tape moving apparatus; the output of the speed transducer being coupled to the input of a first signal compensating network and also to the input of a second signal compensating network, the first signal compensating network transferring, to its output, a greater proportion of its input than the second signal compensating network; the output of the first signal compensating network being coupled to the subtractive input of a first signal summing junction, and the output of the second signal compensating network being coupled to the subtractive input of a second signal summing junction; the output of the first signal summing junction being coupled to the input of the first amplifier and the output of the second summing junction, inverted by means of a signal inverter, being coupled to the input of the second amplifier; and the additive inputs of both the first signal summing junction and the second signal summing junction being simultaneously coupled to a speed demand signal reflecting the required speed of the first tape moving apparatus.

According to another aspect of the present invention there is provided a magnetic tape drive, for retrievable, informational, data storage, wherein there is also provided apparatus, acting through a magnetic head for data recording and data recovery, together with tape transport apparatus comprising; tape storage apparatus, and tape speed control apparatus; the tape storage apparatus consisting of two reels, a first reel paying out and a second reel taking up the tape, the tape being moved from the first to the second reel of the tape storage apparatus, passing adjacent to the magnetic head by the tape speed control apparatus; the tape speed control apparatus being a cross coupled servo, driving, by means of a first amplifier, having unidirectional output, a first tape moving motor, and by means of a second amplifier, of lesser gain, also having unidirectional output, a second tape moving motor; the two tape moving motors being separately coupled to and causing to rotate about their centres, each of the two reels, a rotational speed transducer being coupled to the first tape moving motor; the output of the rotational speed transducer being coupled to the input of a first signal compensating network and also to the input of a second signal compensating network, the first signal compensating network transferring, to its output, a greater proportion of its input then the second signal compensating network; the output of the first signal compensating network being coupled to the subtractive input of a first signal summing junction, and the output of the second signal compensating network being coupled to the subtractive input of a second signal summing junction; the output of the first signal summing junction being coupled to the input of the first amplifier, and the output of the second summing junction, inverted by means of a signal inverter, being coupled to the input of the second amplifier; and the additive inputs of both the first signal summing junction and the second signal summing junction being simultaneously coupled to a speed demand signal reflecting the required rotational speed of the first tape moving motor.

According to another aspect of the present invention there is provided a magnetic tape drive, for retrievable, informational, data storage, wherein there is also provided apparatus, acting through a magnetic head, for data recording and data recovery, together with tape transport apparatus comprising; tape storage apparatus, and tape speed control apparatus; the tape storage apparatus consisting of a closed cassette wherein the tape is stored, coiled, on two enclosed reels, the first reel paying out and the second reel taking up the tape, the tape intermediate between the reels, passing to the outside of the cassette, the tape being caused to move from the first to the second reel of the closed cassette, and pass adjacent to the magnetic head, by the tape speed control apparatus; the tape speed control apparatus being a cross coupled servo, driving, by means of a first amplifier, having unidirectional output, a first tape moving motor, and by means of a second amplifier, of lesser gain, also having unidirectional output, a second tape moving motor; a rotational speed transducer being coupled to the first tape moving motor, the output of the speed transducer being coupled to the input of a first signal compensating network and also to the input of a second signal compensating network, the first signal compensating network transferring, to its output, a greater proportion of its input than the second signal compensating network; the output of the first signal compensating network being coupled to the subtractive input of a first signal summing junction, and the output of the second signal compensating network being coupled to the subtractive input of a second signal summing junction; the output of the first signal summing junction being coupled to the input of the first amplifier and the output of the second summing junction, inverted by means of a signal inverter, being coupled to the input of the second amplifier; and the additive inputs of both the first signal summing junction and the second signal summing junction being simultaneously coupled to a speed demand signal reflecting the required rotational speed of the first tape moving motor.

According to another aspect of the present invention there is provided a tape transport mechanism tape drive, comprising; tape storage apparatus, and tape speed control apparatus; the tape storage apparatus consisting of two parts, a first part paying out and a second part taking up the tape, the tape being moved from the first to the second part of the tape storage apparatus, by the tape speed control apparatus; the tape speed control apparatus being a cross coupled servo, driving by means of a first amplifier, having unidirectional output, a first tape moving apparatus, and by means of a second amplifier of lesser gain also having unidirectional output, a second tape moving apparatus; a speed transducer being coupled to the first tape moving apparatus; the output of the speed transducer being coupled to the input of a first signal compensating network and also to the input of a second signal compensating network, the first signal compensating network transferring, to its output, a greater proportion of its input than the second signal compensating network; the output of the first signal compensating network being coupled to the subtractive input of a first signal summing junction, and the output of the second signal compensating network being coupled to the subtractive input of a second signal summing junction; the output of the first signal summing junction being coupled to the input of the first amplifier and the output of the second summing junction, inverted by means of a signal inverter, being coupled to the input of the second amplifier; and the additive inputs of both the first signal summing junction and the second signal summing junction being simultaneously coupled to a speed demand signal reflecting the required speed of the first tape moving apparatus.

According to another aspect of the present invention there is provided a tape transport mechanism comprising; tape storage apparatus, and tape speed control apparatus; the tape storage apparatus consisting of two reels, a first reel paying out and a second reel taking up the tape, the tape being moved from the first to the second reel of the tape storage apparatus, by the tape speed control apparatus; the tape speed control apparatus being a cross coupled servo, driving, by means of a first amplifier, having unidirectional output, a first tape moving motor, and by means of a second amplifier of lesser gain also having unidirectional output, a second tape moving motor; the two moving motors being separately coupled to, and causing to rotate about their centres, each of the two reels, a rotational speed transducer being coupled to the first tape moving motor; the output of the rotational speed transducer being coupled to the input of a first signal compensating network and also to the input of a second signal compensating network, the first signal compensating network transferring, to its output, a greater proportion of its input than the second signal compensating network; the output of the first signal compensating network being coupled to the subtractive input of a first signal summing junction, and the output of the second signal compensating network being coupled to the subtractive input of a second signal summing junction; the output of the first signal summing junction being coupled to the input of the first amplifier and the output of the second summing junction, inverted by means of a signal inverter, being coupled to the input of the second amplifier; and the additive inputs of both the first signal summing junction and the second signal summing junction being simultaneously coupled to a speed demand signal reflecting the required rotational speed of the first tape moving motor.

According to another aspect of the present invention there is provided a tape transport mechanism comprising; tape storage apparatus, and tape speed control apparatus; the tape storage apparatus consisting of a closed cassette wherein the tape is stored, coiled, on two enclosed reels, a first reel paying out and a second reel taking up the tape, the tape intermediate between the reels passing to the outside of the cassette, the tape being moved from the first to the second part of the closed cassette, by the tape speed control apparatus; the tape speed control apparatus being a cross coupled servo, driving, by means of a first amplifier, having unidirectional output, a first tape moving motor, and by means of a second amplifier, of lesser gain, also having unidirectional ouput, a second tape moving motor; a rotational speed transducer being coupled to the first tape moving motor; the output of the speed transducer being coupled to the input of a first signal compensating network and also to the input of a second signal, compensating network, the first signal compensating network transferring, to its output, a greater proportion of its input than the second signal compensating network; the output of the first signal compensating network being coupled to the subtractive input of a first signal summing junction, and the output of the second signal compensating network being coupled to the subtractive input of a second signal summing junction; the output of the first signal summing junction being coupled to the input of the first amplifier and the output of the second summing junction, inverted by means of a signal inverter, being coupled to the input of the second amplifier; and the additive inputs of both the first signal summing junction and the second signal summing junction being simultaneously coupled to a speed demand signal reflecting the required rotational speed of the first tape moving motor.

DESCRIPTION OF A PREFERRED EMBODIMENT

1. Description of a typical Prior Art System

Figure 1:
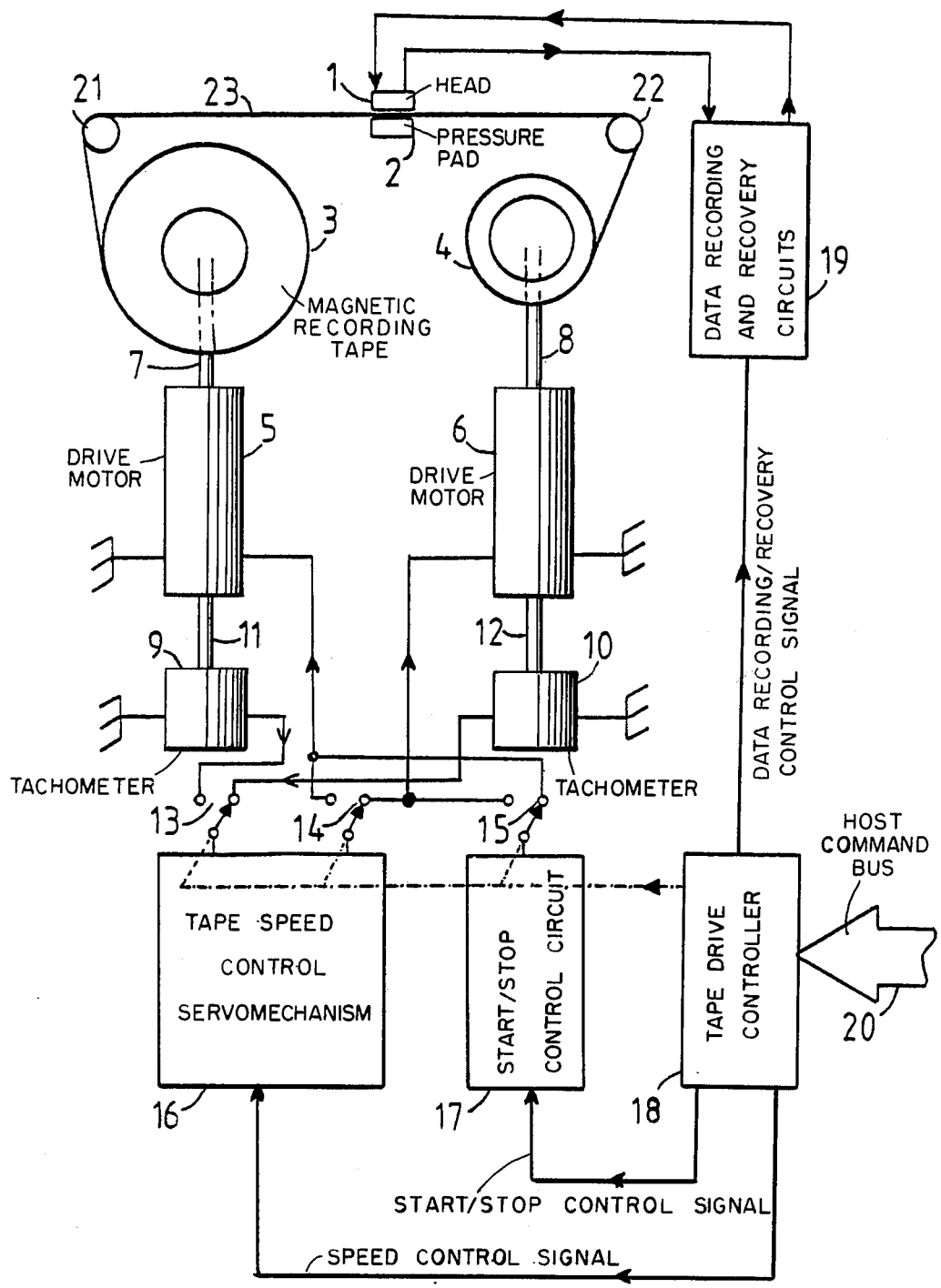
FIG. 1 shows a typical prior art system, employing switching for tape direction reversal.

FIG. 1 shows a typical prior art system. Reel drive motors (5 and 6), each coupled by a mechanical coupling (7 and 8) to the tape reels (3 and 4), are also individually coupled, by a second set of mechanical couplings (11 and 12) to rotational speed transducers (9 and 10). The tape (23), intermediate between the reels (3 and 4), passes between the read/write head (1) and the head pressure pad (2), the read/write head being coupled to data recording and data recovery circuits (19).

The reel turning motors (5 and 6) are driven, alternately, by the tape speed control servo (16) and the stopping and starting control circuits (17) depending on the direction of travel of the tape (23). Similarly, the rotational speed transducers (9 and 10) are alternately connected as the feedback signal, to the tape speed control servo (16), once again depending on the direction of the tape. Three ganged double throw switches are indicated (13, 14, 15). The first switch (13) selects which rotational speed transducer (9 or 10) is to be used as the feedback elements by the tape speed control servo (16). The second switch (14) selects which reel turning motor (5 or 6) is to be driven by the tape speed control servo (16). The third switch (15) selects which motor (6 or 5) is to be driven by the stopping and starting control circuits (17).

The switching (13, 14, 15) the tape speed control servo (16), the stopping and starting control circuits (17) and the data recording and data recovery circuits (19) are all responsive to signals from the tape drive controller (18), which, in its turn, is responsive to signals (20) from whatever host system is employing the tape drive.

In passing between the tape storage reels (3 and 4) the tape (23) passes over two idler pulleys (21 and 22) which bring the tape (23) into the plane of the head (1) irrespective of the diameters of the two reels (3 and 4). If a tape cassette is employed, these idler pulleys (21 and 22) become integral with the cassette.

2. Description of the system embodying the present Invention

Figure 2:
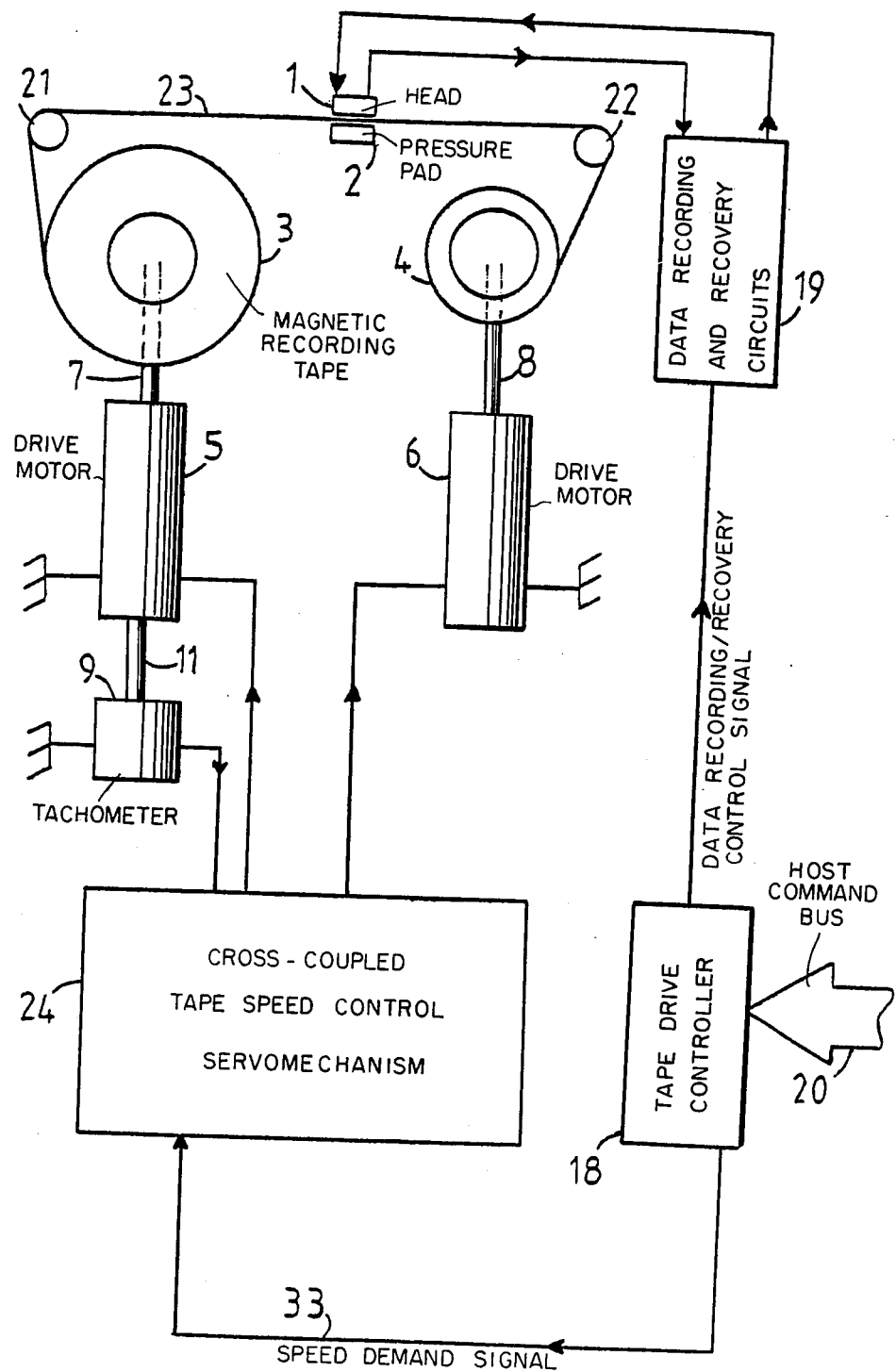
FIG. 2 shows the system employing the present invention.

FIG. 2 shows the system embodying the present invention. Its operation is similar to that of the prior art system, with the exceptions that the switches (13, 14, and 15) and the stopping and starting control circuits (17) are replaced by a single cross coupled tape speed control servo (24) and one of the rotational speed transducers (10) is no longer required. The coupling (33) from the tape drive controller (18) consists of a single analog signal, indicative by magnitude of the required rotational speed of the reel drive motor (5) and by polarity, of the direction of travel required of the tape (23). By varing the signal on the coupling (33) from one polarity, through zero to the other polarity, the tape drive controller (18) causes the tape (23) to travel at varying controlled speeds in one direction, causes the tape (23) to stop in a controlled fashion and to travel at various controlled speeds in the in the opposite direction, no switching or stop/start control circuits being required.

3. Detailed description of the cross coupled tape speed Control servo (24)

Figure 3:
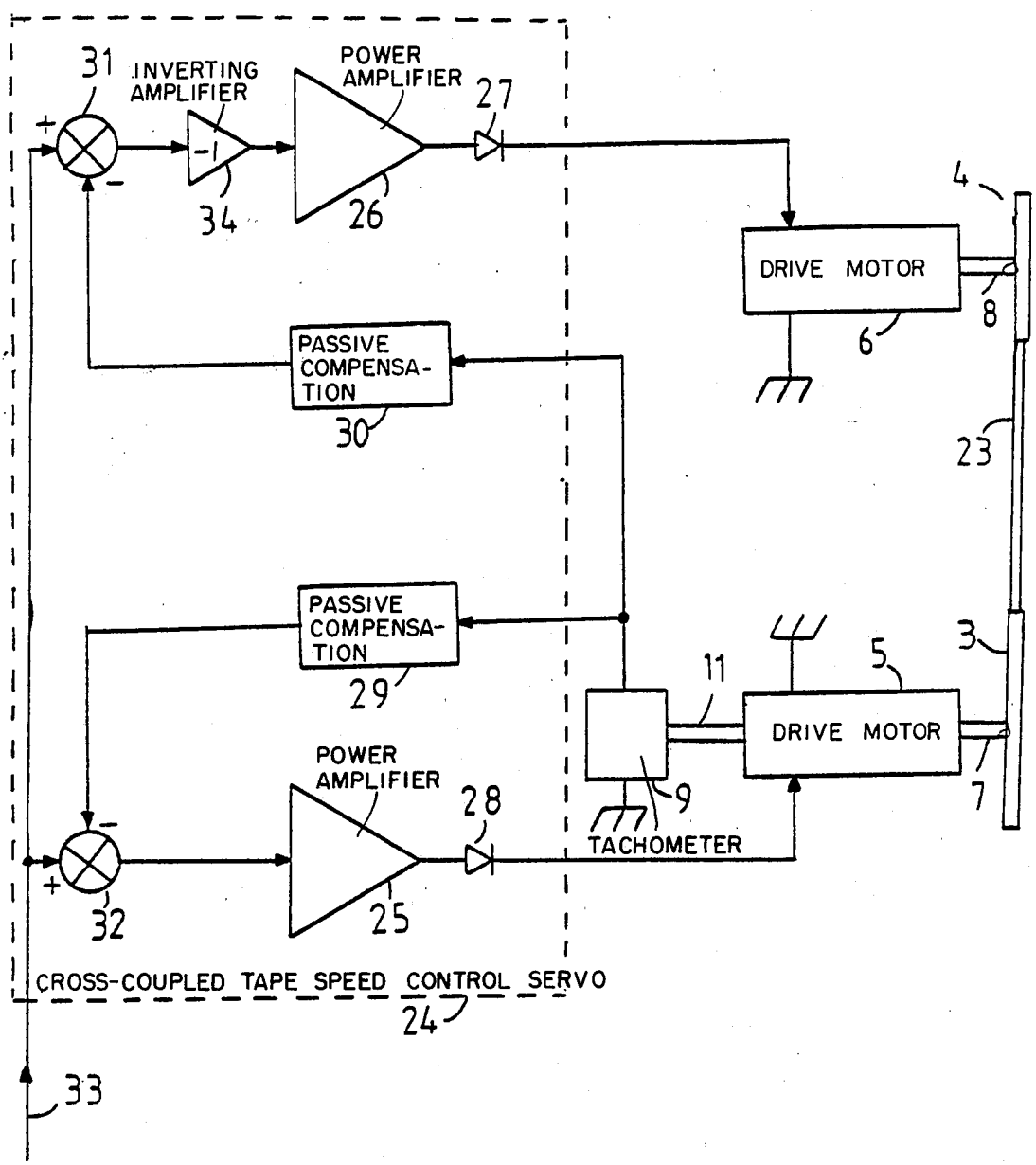
FIG. 3 shows details of the cross coupled servo tape speed control system.

FIG. 3 shows details of the cross coupled tape speed control servo (24), coupled to its associated elements from FIG. 2.

The servo comprises first and second power amplifiers (25 and 26), the amplification of the first power amplifier (25) being greater than that of the second power amplifier (26); an inverting amplifier (34), causing negative signals to become positive signals of the same magnitude and vice versa; a first signal summing junction (32) and a second signal summing junction (31); and a first signal compensating network (29) and a second signal compensating network (30). The first signal compensating network (29) delivers, to its output, a greater proportion of its input signal, than does the second signal compensating newtork (30).

A first reel turning motor (5) is coupled by mechanical coupling (11) to a rotational speed transducer (9) and by another mechanical coupling (7) to the first tape reel (3). A second reel turning motor (6), is coupled by a mechanical coupling (8), to the second tape reel (4). The first reel turning motor (5) is driven by the first amplifier (25), the diode (28) being indicative of the unipolarity of output signals from the amplifier (25). The second reel turning motor (6) is driven by the second amplifier (26), the diode (27) being again being indicative of the unipolarity of output signals from the amplifier (26).

The first amplifier (25) has, as its input, signals coupled from the output of the first signal summing junction (32). The second amplifier (26) has as its input, signals coupled from the output of the inverting amplifier (34), which, in turn, has as its own input, signals coupled from the output of the second signal summing junction (31).

The output signal of the rotational speed transducer (9) is simultaneously coupled to the inputs of the first signal compensating network (30) and the second signal compensating network (29). The output of the first signal compensating network (29) is coupled subtractively to the input of the first signal summing junction (32). The output of the second signal compensating network is coupled subtractively to the input of the second signal summing junction (31).

A speed demand signal from the tape drive controller (18), on the external speed demand input connector (33), is simultaneously coupled, additively, into the inputs of the first signal summing junction (32) and the input of the second signal summing junction 31.

4. Description of the operation of the cross coupled tape speed control servo (24)

References here are found in FIG. 3.

a. Forward motion

With the speed demand signal on the connector (33) is positive, and the tape stationary, the output of the rotational speed transducer (9) is zero, so that the output of the first signal summing junction (32) is positive and the output of the second signal summing junction (31) is also positive. The positive output of the first signal summing junction (32) is amplified by the first amplifier (25) and transmitted by the diode (28) to the first reel turning motor (5). By generating torque the first reel turning motor (5) accelerates the tape (23) by way of its coupling with the first tape reel (3), winding the tape (23) onto the first tape reel (3). The positive output of the second signal summing junction (31) is inverted by the inverting amplifier (34), presenting a negative signal to the input of the second amplifier. This signal cannot be transmitted to the second reel turning motor (6) because of the diode (27). The second reel turning motor (6) thus receives no drive, can generate no torque, and idles, being passively turned by the motion of the tape (23) as it is wound, by the first reel turning motor (5), from the second tape reel (4) onto the first tape reel (3).

The first reel turning motor (5) continues to accelerate until the output of the rotational speed transducer (9), positive by virtue of the forward motion of the tape, as coupled to the first signal summing junction (32) by the first signal compensating network (29), equals the speed demand signal on the input connector (33). At this point the output of the first signal summing junction (32) becomes zero, removing input signals from the first amplifier (25) and so cutting off the drive to the first reel turning motor (5). A proportional speed control servo action is thus obtained, controlling the rotational speed of the first reel turning motor (5).

Because the first signal compensating network (29) delivers to its output, a greater proportion of its input signal than does the second signal compensating network (30) the output of the second signal summing junction (31) does not pass through zero when the first reel turning motor (5) has attained its controlled speed, but remains positive, causing the second reel turning motor (6) to remain in an idling state.

b. Stopping from forward motion

In order to stop the tape (23) the speed demand signal on the external connector (33) is made zero. The tape (23) still moving forwards, the output of the rotational speed transducer (9), positive by virtue of the forwards motion of the tape, coupled subtractively by way of the first signal compensating network (29), to the first signal summing junction (32), causes the output of the first signal summing junction (32) to become negative. This signal cannot be transmitted to the first reel turning motor (5) because of the diode (28). The first reel driving motor (5) thus receives no drive and generates no torque. Similarly, the output of the rotational speed transducer (9) subtractively coupled, by way of the second signal compensating network (30), to the input of the second signal summing junction (31), causes the output of the second signal summing junction (31) also to be negative. This output, being inverted by the inverting amplifier (34) to become a positive voltage, is amplified by the second amplifier (26) and transmitted by the diode (27) to the second reel turning motor (6). The second reel turning motor (6), being driven, generates torque which attempts to wind the tape (23) onto the second tape storage reel (4), so counteracting the forward motion of the tape (23) and acting as a brake. This continues until the output of the rotational speed transducer (9) falls to zero, indicating that the tape (23) has stopped moving. At this point, the outputs of the two signal summing junctions (31 and 32) are simultaneously zero, removing all drive from the second reel turning motor (6). In the absence of non-zero signals from the two summing junctions (31 and 32) there is no subsequent motion of the tape (23).

c. Backward Motion

With the speed demand signal from the external connector (33) negative, and the tape stationary, the output of the first signal summing junction (32) is negative and the output of the second signal summing junction (31) is also negative. The output of the second signal summing junction (31) being inverted by the inverting amplifier (34) to become a positive signal, is amplified by the second amplifier (26) and transmitted by the diode (27) to the second reel turning motor (6). The second reel turning motor (6) being driven, generates torque, accelerating the tape (23) and winds it onto the second tape storage reel (4) from the first tape storage reel (3). The output of the first signal summing junction (32) being negative, this signal cannot be transmitted to the first reel turning motor (5) because of the diode (28). The first reel turning motor thus idles, being passively turned by the motion of the tape (23) as it is moved onto the second tape storage reel (4) from the first tape storage reel (3) by the second tape turning motor (6).

The tape (23) continues to accelerate until the output signal of the rotational speed transducer (9), negative by virtue of the backwards motion of the tape, coupled to the first summing junction (32) by way of the first signal compensating network (29), equals the magnitude of the demand signal from the external connector (33). At this point, the output of the first signal summing junction (32) swings through zero towards positive. The first amplifier (25) may now transmit its amplified signals through the diode (28) to the first reel turning motor (5). Because the first signal compensating network (29) delivers, to its output, a greater proportion of its input than does the second signal compensating network, the output of the second summing junction (31) remains negative, while the tape (23) is at controlled speed, so that the second tape turning motor (6) continues to receive drive, winding the tape (23), onto the second tape storage reel (4).

The first tape turning motor (5) having received drive, and being driven by an amplifier (25) of greater gain than the amplifier (26) driving the second tape turning motor (6), acts as a powerful brake, acting through the tape (23), maintaining its own controlled speed of rotation against the pull of the second tape turning motor (6).

In this way a proportional rotational speed control servo is established maintaining the speed of the first reel turning motor (5), just as in the case of forward motion.

d. Stopping from Backward Motion

In order to stop the tape (23), the speed demand signal on the external connector (33) is made zero. The tape (23) still moving backwards, the output of the rotational speed transducer (9), negative by virtue of the backwards motion of the tape, and coupled subtractively by way of the second signal compensating network (30) to the second signal summing junction (31), causes the output of the second signal summing junction (31) to become positive. This signal being inverted by the inverting amplifier (34), is presented as a negative input to the second amplifier (26), this input being unable to be transmitted to the second reel turning motor (6) because of the diode diode (27). The second turning motor (6) thus receives no drive and thereby generates no torque.

The output of the rotational speed transducer, (9) being coupled subtractively by way of the first signal compensating network (29) and being negative by virtue of the backwards motion of the tape, to the first signal summing junction (32), causes the output of the first summing junction (32) to be positive. This signal is amplified by the first amplifier (25) and transmitted by the diode (28) to the first reel drive motor (5). The first reel drive motor (5) being driven, generates torque which tries to wind the tape (23) onto the first tape storage reel (3), counteracting the backwards motion of the tape, and acting as a brake.

This continues until the output of the rotational speed tranducer (9) becomes zero, indicating that the tape (23), has stopped moving. At this point, the outputs of the two signal summing junctions (31 and 32) are simultaneously zero, removing all drive from the first reel turning motor (5).

In the absence of non-zero signals from the two summing junctions (31 and 32), there is no subsequent motion of the tape (23).

What I claim is:

1. A tape drive system for driving first and second tape storage reels containing a tape, comprising:
   first and second tape moving means mechanically coupled, respectively to said first and second tape storage reels;
   a tape drive controller for providing an analog signal indicative by magnitude of the required rotational speed of said first tape storage reel and by polarity of the direction of travel of said tape;
   a tape speed control servo including:
      a speed transducer mechanically coupled to said first tape moving means for producing a signal indicating the speed and direction of said first tape moving means;
      first and second signal compensating networks each receiving the output of said speed transducer, the first signal compensating network delivers at its output a greater portion of its input signal than does the second signal compensating network;
      a first signal summing junction for receiving and summing the output of said first signal compensating network and the output of said tape drive controller;
      a second signal summing junction for receiving and summing the output of said second signal compensating network and the output of said tape drive controller;
      a signal inverter for receiving and inverting the output of said second summing junction;
      a first signal amplifier means receiving the output of said first summing junction for providing a unidirectional control signal to said first tape moving means; and
      a second signal amplifier means receiving the output of said signal inverter for providing a unidirectional control signal to second tape moving means.

2. A tape drive is recited in claim 1 wherein;
   said tape is magnetic tape,
   said transducing means is a magnetic head,
   said tape storage means consists of two reels whereon said tape is coiled, one reel paying out and the other taking up said tape,
   said first tape moving means and said second tape moving means are motors, separately coupled to and individually causing to rotate about their centres, each of said two reels, and
   said speed transducing means is a rotational speed transducer.

3. A tape drive as recited in claim 1, wherein;
   said tape is magnetic tape,
   said transducing means is a magnetic head,
   said tape storage means is a closed cassette, wherein said tape is stored, coiled, on two enclosed reels, one reel paying out and the other taking up said tape, the tape, intermediate between the said two enclosed reels, passing to the outside surface of said cassette,
   said first tape moving means and said second tape moving means are motors, separately coupled to and individually causing to rotate about their centres, each of said two enclosed reels, and
   said speed transducing means is a rotational speed transducer.

4. A tape transport comprising;
   tape storage means and
   tape speed control means,
   said tape storage means consisting of two parts, one paying out and the other taking up said tape,
   said tape being coupled to said tape speed control means,
   said tape being moved between said two parts of said tape storage means by said tape speed control means, and where said tape speed control means comprises;
   first tape moving means,
   second tape moving means,
   first signal amplification means,
   second signal amplification means,
   first signal summing means,
   second signal summing means,
   first signal compensating means,
   second signal compensating means,
   speed transducing means, and
   signal inverting means, said first signal amplification means and said second signal amplification means having unidirectional outputs, said first signal amplification means causing greater amplification of signals than said second signal amplification means, said first signal compensating means delivering to its output a greater proportion of its input than said second signal compensation means, said first signal summing means and said second signal summing means each having one additive and one subtract input, the input of said speed transducing means being coupled to the output of said first moving means, the output of said speed transducing means being coupled to the input of said first signal compensating means, the output of said first signal compensating means being coupled to said subtractive input of said first signal summing means, the output of said first signal summing means being coupled to the input of said first signal amplification means, the output of said first signal amplification means being coupled to and driving, said first tape moving means, the output of said speed transducing means also being coupled to the input of said second signal compensating means, the output of said second signal compensating means being coupled to said subtractive input of said second signal summing means, the output of said second signal summing means being coupled to the input of said signal inverting means, the output of said signal inverting means being coupled to the input of said second signal amplification means, the output of said second signal amplification means being coupled to, and driving, said second tape moving means; and where a speed demand signal, being indicative of the required speed of said first tape moving means, is simultaneously coupled to said additive input of said first signal summing means and said additive input of said second signal summing means.

5. A tape transport as recited in claim 4 wherein, said tape storage means consists of two reels whereon said tape is coiled, one reel paying out and the other taking up said tape, said first tape moving means and said second tape moving means are motors, separately coupled to and individually causing to rotate about their centres, each of said two reels, and said speed transducing means is a rotational speed transducer.

6. A tape transport as recited in claim 4, wherein, said tape storage means is a closed cassette, wherein said tape is stored, coiled, on two enclosed reels, one reel paying out and the other taking up said tape, the tape, intermediate between the said two enclosed reels, passing to the outside surface of said cassette, said first tape moving means and said second tape moving means are motors, separately coupled to and individually causing to rotate about their centres, each of said two enclosed reels, and, said speed transducing means is a rotational speed transducer.

7. A cross-coupled system for controlling tape movement between first and second tape reels in response to a tape drive controller analog signal, comprising:

speed transducer means coupled to said first tape reel;

signal compensating network means receiving the output of said transducer means and generating first and second compensated signals, said first compensated signal having a magnitude which is a greater portion of the magnitude of said transducer output than is said second compensating signal;

signal summing means receiving said tape drive controller analog signal and said first and second compensated signals, for summing said analog signal with the inversion of said first compensated signal to generate a first summing signal and summing said analog signal with the inversion of second compensated signal to generate a second summing signal;

means for receiving said first summing signal and generating a first unidirectional control signal for driving the first tape reel; and means for receiving said second summing signal and generating an inverted, second unidirectional control signal for driving the second tape reel.

8. The apparatus of claim 7 in which said signal compensating means has a first compensating network for generating said first compensated signal and a second compensating network for generating said second compensated signal.

9. The apparatus of claim 7 in which said signal summing means has a first summing junction receiving said first compensated signal and said tape drive controller analog signal for generating said first summing signal and a second signal summing junction receiving said tape drive controller analog signal and said second compensated signal for generating said second summing signal.

10. The apparatus of claim 7 in which said means for receiving said first summing signal includes a first signal summing amplifier connected to a diode, said first summing amplifier receiving the output of said first summing junction and providing as an output said first unidirectional control signal, said means for receiving said second summing signal including an inverter connected to a second signal amplifier further connected to a diode, said inverter receiving the output of said second summing junction, said diode output being said second unidirectional control signal for driving the second tape reel.

* * * * *